United States Patent
Ibe et al.

(10) Patent No.: US 10,710,157 B2
(45) Date of Patent: Jul. 14, 2020

(54) ADDITIVE MANUFACTURING MATERIAL FOR POWDER RAPID PROTOTYPING MANUFACTURING

(71) Applicant: FUJIMI INCORPORATED, Kiyosu-shi, Aichi (JP)

(72) Inventors: Hiroyuki Ibe, Kiyosu (JP); Junya Yamada, Kiyosu (JP)

(73) Assignee: FUJIMI INCORPORATED, Kiyosu-Shi (JP)

(*) Notice: Subject to any disclaimer, the term of this patent is extended or adjusted under 35 U.S.C. 154(b) by 0 days.

(21) Appl. No.: 16/064,774

(22) PCT Filed: Dec. 20, 2016

(86) PCT No.: PCT/JP2016/087986
§ 371 (c)(1),
(2) Date: Jun. 21, 2018

(87) PCT Pub. No.: WO2017/110829
PCT Pub. Date: Jun. 29, 2017

(65) Prior Publication Data
US 2018/0369909 A1 Dec. 27, 2018

(30) Foreign Application Priority Data
Dec. 22, 2015 (JP) .................. 2015-250696

(51) Int. Cl.
*B22F 1/00* (2006.01)
*C04B 35/626* (2006.01)
(Continued)

(52) U.S. Cl.
CPC .......... *B22F 1/0059* (2013.01); *B22F 1/0014* (2013.01); *B22F 1/0096* (2013.01);
(Continued)

(58) Field of Classification Search
None
See application file for complete search history.

(56) References Cited

U.S. PATENT DOCUMENTS

| 2008/0241522 A1 | 10/2008 | Mizuno | |
| 2015/0089881 A1* | 4/2015 | Stevenson | C09K 3/1409 51/309 |
| 2015/0147572 A1* | 5/2015 | Sato | B22F 1/00 428/402 |

(Continued)

FOREIGN PATENT DOCUMENTS

| EP | 3 159 141 A1 | 4/2017 |
| JP | 2008-240072 A | 10/2008 |

(Continued)

OTHER PUBLICATIONS

S. Kumar, "Manufacturing of WG-Go moulds using SLS machine", Elsevier, Journal of Materials Processing Technology, 209, Apr. 21, 2009, pp. 3840-3848.

Kyogoku et al., Report of Kindai University Fundamental Technology for Next Generation Research Institute, ISSN 2185-8802, vol. 2, Jun. 2011, pp. 95-100.

(Continued)

*Primary Examiner* — Ronak C Patel
(74) *Attorney, Agent, or Firm* — Foley & Lardner LLP (57) ABSTRACT

A molding material is provided which, despite containing a ceramic, enables efficient molding for producing high-density molded articles. The present invention provides a molding material to be used in powder laminate molding. This molding material contains a first powder which contains a ceramic, and a second powder which contains a metal. Further the first powder and the second powder are bonded by sintering to configure granulated sintered particles. The granule strength of the granulated sintered particles is greater than 1 MPa and less than 10,000 MPa.

4 Claims, 3 Drawing Sheets

(51) Int. Cl.
- *B22F 3/105* (2006.01)
- *C04B 35/64* (2006.01)
- *B28B 1/00* (2006.01)
- *B33Y 70/00* (2020.01)
- *B33Y 10/00* (2015.01)
- *B33Y 80/00* (2015.01)
- *C22C 29/08* (2006.01)
- *C22C 1/05* (2006.01)
- *C22C 32/00* (2006.01)

(52) U.S. Cl.
CPC ............ *B22F 3/1055* (2013.01); *B28B 1/001* (2013.01); *B33Y 10/00* (2014.12); *B33Y 70/00* (2014.12); *B33Y 80/00* (2014.12); *C04B 35/626* (2013.01); *C04B 35/64* (2013.01); *C22C 1/05* (2013.01); *C22C 29/08* (2013.01); *C22C 32/00* (2013.01); *B22F 2304/10* (2013.01); *B22F 2999/00* (2013.01)

(56) References Cited

U.S. PATENT DOCUMENTS

| | | | |
|---|---|---|---|
| 2016/0297097 A1* | 10/2016 | Riman | .................... C04B 35/46 |
| 2016/0368057 A1* | 12/2016 | Hopkins | ............... C04B 35/111 |
| 2017/0189960 A1 | 7/2017 | Ibe | |

FOREIGN PATENT DOCUMENTS

| | | | |
|---|---|---|---|
| JP | 2016-172904 A | | 9/2016 |
| WO | WO 2013/176058 A1 | | 11/2013 |
| WO | WO 2015/069849 A1 | | 5/2015 |
| WO | WO 2015/073081 A1 | | 5/2015 |
| WO | WO 2015/162206 | * | 10/2015 |
| WO | WO-2015/162206 A2 | | 10/2015 |
| WO | WO 2015/194678 A1 | | 12/2015 |

OTHER PUBLICATIONS

Office Action issued in corresponding European Application No. 16878718.2 dated Apr. 16, 2020.

* cited by examiner

ADDITIVE MANUFACTURING MATERIAL FOR POWDER RAPID PROTOTYPING MANUFACTURING

TECHNICAL FIELD

The present invention relates to an additive manufacturing material for powder rapid prototyping manufacturing. The present application claims priority to Japanese Patent Application No. 2015-250696 filed on 22 Dec. 2015, the entire content of which is entirely incorporated herein by reference.

BACKGROUND ART

Additive manufacturing technique is to adhere materials to produce articles based on numerical representations (typically 3D CAD data) of three-dimensional shapes. Typically, additive manufacturing materials are bonded or sintered as a thin layer having a shape corresponding to a cross-section of an article to be manufactured and the thin layers are stacked, thereby manufacturing a desired three-dimensional shape. In additive manufacturing, resin products have been widely manufactured from resin materials because the handling thereof is easy. However, an improvement in powder rapid prototyping manufacturing (powder lamination) technique is recently sought which allows direct manufacturing of metal or cermet parts from powder materials containing metals and cermets without requiring moulds (for example, see PTLs 1 and 2).

CITATION LIST

Non Patent Literature

Non Patent Literature 1: S. Kumar, J. MATER. PROCESS. TECHNOL 209 (2009) 3840-3848
Non Patent Literature 2: Reports from Kinki University Research Institute of Fundamental Technology for Next Generation, Vol. 2 (2011) 95-100

SUMMARY OF INVENTION

Technical Problem

It has been understood that it is important to adjust properties of powder materials for powder rapid prototyping manufacturing in order to obtain articles with high quality. For example, powder for lamination manufacturing is required to have a uniform grain size and be formed with particles which are approximately true spheres and have low porosity (less pores) therein. However, articles manufactured with such conventional powder materials have issues of the relative density of less than 100% because voids are inevitable between particles that form the powder.

Therefore, when, for example, a metal part for which high relative density is not required in the whole region is manufactured by powder rapid prototyping manufacturing, the core in the metal part, for example, is manufactured to have low density and the shell at the surface is manufactured to have high density. In this case, the core having low density, for example, is manufactured with a heat source of a high-power laser so that the laminated thickness per scan is relatively high (such as about 90 μm) while the shell portion having high density is manufactured with a relatively low-power laser so that the laminated thickness per scan is low (such 30 μm or less).

Therefore, there is a problem in manufacturing a part required to have high density even at the central part thereof that a thin laminate has to be repeatedly manufactured over an extremely long time. Alternative means include increasing the relative density by infiltrating bronze into a porous manufactured article or increasing laser absorbance by coating a powder material with a laser absorbent.

Powder materials of cermet including ceramic components generally have a high melting point and mechanical strength compared to metal materials and resin materials. Therefore, the above problem is more significant in manufacturing of parts containing ceramics generally having higher melting points than metals. Thus, at present, the relative density of powder rapid prototyping manufactured articles containing ceramics, for example, can reach only up to about 60% even when various manufacturing conditions and properties of powder materials are strictly adjusted. Even in this case, there could be a problem of an extremely long time for manufacturing.

With the foregoing in view, an object of the present invention is to provide a novel powder-shaped additive manufacturing material for powder rapid prototyping manufacturing that contains ceramic while allowing more efficient manufacturing of articles with high density.

Solution to Problem

In order to solve the above problem, the technique described herein provides an additive manufacturing material for powder rapid prototyping manufacturing. The additive manufacturing material contains a first powder containing a ceramic and a second powder containing a metal. The first powder and the second powder are bound by sintering to form granulated sintered particles. The granulated sintered particles are characterised to have a granule strength of above 1 MPa and less than 10000 MPa.

It has been commonly understood that one of the important requirements for conventional powder-shaped additive manufacturing materials is low porosity (less pores) of the additive manufacturing material in order to avoid formation of pores in manufactured articles. In contrast, the material described herein is attained in the form of granulated sintered particles as described above. In other words, the first powder and the second powder form primary particles which are sintered to form secondary particles. Therefore, granulated sintered particles inevitably contain voids (pores). In other words, a plurality of primary particles is three-dimensionally bound through voids. By having such a shape, the additive manufacturing material is easily melted even when the material contains a ceramic, allowing manufacturing of dense manufactured articles.

In the granulated sintered particles (namely secondary particles), primary particles may be relatively smaller and lighter than secondary particles. When subjecting to powder rapid prototyping manufacturing, the granulated sintered particles may collapse by, for example, laser irradiation. If collapsed granulated sintered particles are scattered, the amount scattered leads to the reduction of the amount of the additive manufacturing material, resulting in reductions of manufacturing efficiency and manufacturing speed. Moreover, when manufacturing is performed based on slice data generally used in powder manufacturing, a problem of low dimension accuracy may result. Thus, in the technique described herein, primary particles in the granulated sintered particles are sintered together to adjust the granule strength to be above 1 MPa and less than 10000 MPa. As a result of this, problems caused by collapsed granulated sintered particles during manufacturing are suppressed. The granule strength is more preferably 10 MPa or more and 5000 MPa or less. As a result of this, the additive manufacturing material that allows manufacturing of dense manufactured articles is provided without requiring reduction of, for example, laser intensity or laser scanning speed. Further, an additive manufacturing material that allows manufacturing of dense manufactured articles is provided even when the laser scanning speed is increased.

The second particles containing a metal may melt with less energy to promote melting of the first powder. Further, because the first powder and the second powder are granulated, separation of a component derived from the first powder and a component derived from the second powder in a manufactured article may be suppressed. As a result of this, the additive manufacturing material described herein is also advantageous in that the material can provide a homogeneous manufactured article.

In a preferable embodiment of the additive manufacturing material described herein, the average particle diameter is 1 µm or more and 100 µm or less. As a result of this, the additive manufacturing material having a size suitable for manufacturing machines in general use is provided.

In a preferable embodiment of the additive manufacturing material described herein, the first powder and the second powder have average particle diameters of 0.1 µm or more and 20 µm or less. As a result of this, the additive manufacturing material that is more easily melted and allows manufacturing of dense manufactured articles is provided. For example, the additive manufacturing material is provided that allows manufacturing of dense manufactured articles with less air bubbles that hardly collapse with an increased laser intensity.

In a preferable embodiment of the additive manufacturing material described herein, the proportion of the second powder in the sum of the first powder and the second powder is 10% by mass or more and 90% by mass or less. It is preferable because as a result of this, manufactured articles having broad compositions and textures may be obtained.

In a preferable embodiment of the additive manufacturing material described herein, the first powder is a carbide ceramic. As a result of this, the affinity for the second powder is preferable and a homogeneous manufactured article having a greater degree of hardness may be manufactured.

The additive manufacturing material contains a ceramic as a constituent, and the ceramic may be contained in the additive manufacturing material in the form of primary particles. The manufacturing particles are melted without collapsing and used for manufacturing. Therefore, it is possible to manufacture dense manufactured articles by powder rapid prototyping manufacturing under common conditions while suppressing reduction of the manufactured thickness per layer. From such viewpoints, the technique described herein also provides a three-dimensional manufactured article of the additive manufacturing material.

In another aspect, the technique described herein also provides a method for manufacturing a three-dimensional manufactured article characterised in that the additive manufacturing material is used for three-dimensional manufacturing.

BRIEF DESCRIPTION OF DRAWINGS

FIG. 4 shows cross-sectional SEM images of manufactured articles according to (a) Comparative Example and (b) Example.

DESCRIPTION OF EMBODIMENTS

Preferable embodiments of the present invention are described hereinafter. The matters that are necessary for practise of the present invention and are other than those specifically described in the present specification are understood and practised by a person skilled in the art on the basis of the teachings on practise of the invention described herein and common technical knowledge as of filing in the art. The dimensional ratios in the drawings are exaggerated for convenience of description and may be different from actual ratios. As used herein, the term "X to Y" indicating a range means "X or more and Y or less", and the terms "weight" and "mass", "% by weight" and "% by mass" and "part(s) by weight" and "part(s) by mass" are respectively interchangeably used.

(Additive Manufacturing Material)

The "additive manufacturing material" described herein is a powder-shaped material for powder rapid prototyping manufacturing. The term "powder rapid prototyping manufacturing" broadly encompasses various manufacturing processes using powder-shaped materials as materials of manufactured articles in the art of additive manufacturing. The powder rapid prototyping manufacturing may use any means for bonding (adhering) of an additive manufacturing material without particular limitation. The powder rapid prototyping manufacturing specifically encompasses, for example, methods referred to as binder jetting, directed energy deposition typically including laser clad welding, electron beam clad welding and arc welding, powder bed fusion typically including laser sintering, selective laser sintering (SLS) and electron beam sintering. It is particularly preferable that the additive manufacturing material described herein is used for directed energy deposition and powder bed fusion from the viewpoint that the material is suitable for manufacturing of dense manufactured articles.

Figure 1:
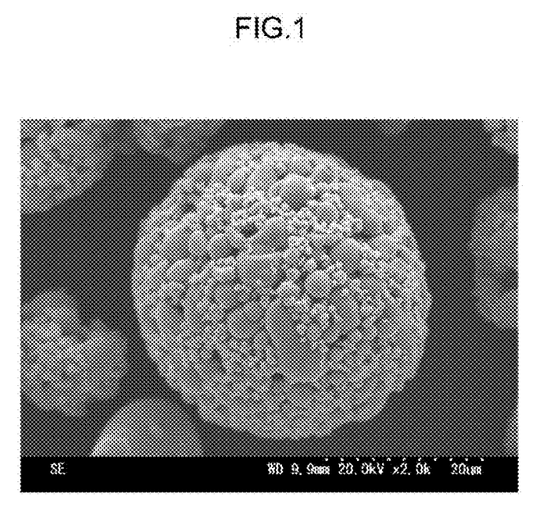
FIG. 1 is a scanning electron microscope (SEM) image of an additive manufacturing material according to one embodiment.

The additive manufacturing material described herein contains a first powder containing a ceramic and a second powder containing a metal. The first powder and the second powder are bound by sintering to form granulated sintered particles. FIG. 1 is a scanning electron microscope (SEM) image illustrating an embodiment of the additive manufacturing material. In this example, relatively rounded and large particles are metal powder (second powder) and relatively small particles are ceramic powder (first powder). The additive manufacturing material described herein may be recognised as if the first powder and the second powder form primary particles and the granulated sintered particles form secondary particles. Particles that form metal powder and particles that form ceramic powder are almost uniformly mixed and dispersed to form secondary particles. In such an additive manufacturing material, primary particles may be desorbed from granulated particles. Therefore, it goes without saying that the first powder and the second powder are allowed to be included in the form of primary particles (such as at 10% by mass or less).

(First Powder)

The first powder substantially contains a ceramic. The first powder typically contains a ceramic as a main component. The term main component in this context means a component that accounts for 70% by mass or more of the first powder. Preferably 80% by mass or more, more preferably 90% by mass or more and particularly preferably 95% by mass or more (typically 98% by mass or more) of the first powder is formed with ceramic. Components other than the ceramic in the first powder include resins, inorganic materials other than the ceramic and metals. Components other than the ceramic are not particularly limited and may be, for example, metal components described hereinbelow. The components are combined (complexed) with the ceramic to form the first powder.

The ceramic may be, for example, a ceramic material formed from any metal oxide (oxide ceramic) or a ceramic material formed from a non-oxide such as a carbide, a boride, a nitride and apatite.

The oxide ceramic may be any metal oxide without particular limitation. The metal element that forms the oxide ceramic may be one or two or more selected from metalloid elements such as boron (B), silicon (Si), germanium (Ge), antimony (Sb) and bismuth (Bi); representative elements such as magnesium (Mg), calcium (Ca), strontium (Sr), barium (Ba), zinc (Zn), aluminium (Al), gallium (Ga), indium (In), tin (Sn) and lead (Pb); transition metal elements such as scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), manganese (Mn), iron (Fe), cobalt (Co), nickel (Ni), copper (Cu), silver (Ag) and gold (Au); and lanthanoid elements such as lanthanum (La), cerium (Ce), praseodymium (Pr), neodymium (Nd), samarium (Sm), europium (Er) and lutetium (Lu). Among others, it is preferable that the metal element is one or more elements selected from Mg, Y, Ti, Zr, Cr, Mn, Fe, Zn, Al and Er.

More specifically, examples of the oxide ceramic include alumina, zirconia, yttria, chromia, titania, cobaltite, magnesia, silica, calcia, ceria, ferrite, spinel, zircon, nickel oxide, silver oxide, copper oxide, zinc oxide, gallium oxide, strontium oxide, scandium oxide, samarium oxide, bismuth oxide, lanthanum oxide, lutetium oxide, hafnium oxide, vanadium oxide, niobium oxide, tungsten oxide, manganese oxides, tantalum oxide, terpium oxide, europium oxide, neodymium oxide, tin oxide, antimony oxide, antimony-containing tin oxide, indium oxide, tin-containing indium oxide, zirconium aluminate oxide, zirconium silicate oxide, hafnium aluminate oxide, hafnium silicate oxide, titanium silicate oxide, lanthanum silicate oxide, lanthanum aluminate oxide, yttrium silicate oxide, titanium silicate oxide, tantalum silicate oxide and the like.

Examples of the non-oxide ceramic include carbides such as tungsten carbide, chromium carbide, vanadium carbide, niobium carbide, molybdenum carbide, tantalum carbide, titanium carbide, zirconium carbide, hafnium carbide, silicon carbide and boron carbide; borides such as molybdenum boride, chromium boride, hafnium boride, zirconium boride, tantalum boride and titanium boride; nitrides such as boron nitride, titanium nitride, silicon nitride and aluminium nitride; complexes such as forsterite, steatite, cordierite, mullite, barium titanate, lead titanate, lead zirconate titanate, Mn—Zn ferrite, Ni—Zn ferrite and sialon; phosphate compounds such as hydroxyapatite and calcium phosphate; and the like.

The above ceramic may contain any element that is doped or substituted. The first powder may contain only one ceramic or two or more ceramics in combination. When the first powder contains two or more ceramics, some or all of the ceramics may form complexes. Examples of the complexed ceramics include, specifically, yttria-stabilised zirconia, partially stabilised zirconia, gadolinium-doped ceria, lanthanum-doped lead zirconate titanate and sialon and complexed oxides described above. By using the first powder formed from the complex, a manufactured article containing the complex may be manufactured.

(Second Powder)

The second powder substantially contains a metal. The second powder typically contains a metal as a main component. The term main component in this context means a component that accounts for 70% by mass or more of the second powder. Preferably 80% by mass or more, more preferably 90% by mass or more and particularly preferably 95% by mass or more (typically 98% by mass or more) of the second powder is formed with metal. Components other than the metal in the second powder include resins and inorganic materials such as ceramics and glass. The components are combined (complexed) with the metal to form the second powder.

The metal is not particularly limited and may be, for example, any elemental substance of metal elements mentioned above as structural elements of the ceramic or an alloy of the element and one or more other elements. Examples of the metal elemental substance typically include magnesium (Mg), aluminium (Al), titanium (Ti), chromium (Cr), manganese (Mn), iron (Fe), cobalt (Co), nickel (Ni), copper (Cu), zinc (Zn), zirconium (Zr), gold (Au), silver (Ag), platinum (Pt), iridium (Ir), bismuth (Bi), niobium (Ni), molybdenum (Mo), tin (Sn), tungsten (W) and lead (Pb).

Examples of the alloy include copper alloys typically including Cu—Al alloy, Cu—Al—Fe alloy, Cu—Ni alloy and Cu—Ni—In alloy; nickel alloys typically including Ni—Al alloy, Ni—Cr alloy (such as Ni-20Cr alloy, Ni-50Cr alloy and Inconel), Ni—Cr—Fe alloy (such as Incoloy), Ni—Cr—Al alloy, Hastelloy (Ni—Fe—Mo alloy, Ni—Cr—Mo alloy) and Ni—Cu alloy (such Monel); cobalt alloys containing cobalt as a main component and typically including Co—Cr—W alloy (such as Stellite), Co—Cr—Ni—W—C alloy, Co—Mo—Cr—Si alloy and Co—Cr—Al—Y alloy; Ni self-fluxing alloys typically including Ni—Cr—Fe—Si—B—C alloy and Ni—Cr—Mo—Cu—Fe—Si—B—C alloy; Co self-fluxing alloys typically including Co—Ni—Cr—Mo—Fe—Si—B—C; low-carbon steels typically including martensite-age hardened steel; carbon steels; stainless steels typically including SUS304, SUS316, SUS410, SUS420J2 and SUS431; titanium alloys typically including Ti-6Al-4V; and the like. The term alloy as used herein means to encompass substances that are formed from the above metal element and one or more other elements and exhibit metallic properties, and the way of mixing thereof may be any of solid solution, intermetallic compound and mixtures thereof.

The second powder may contain any one metal or alloy mentioned above or two or more thereof in combination.

(Granulated Sintered Particles)

The additive manufacturing material described herein is formed as an aggregate of granulated sintered particles in the form of secondary particles as described above. The granulated sintered particle as used herein refers to a particle-like substance (showing the form of a particle) in which primary particles are sintered to be combined and behave as one particle. The term "sintering" as used herein means the state in which primary particles are directly bound. Thus, the sintering may be either of solid phase sintering and liquid phase sintering. The sintering as used herein may also encompass so-called fusion or melt-binding.

Such an additive manufacturing material may be attained by, for example, firmly combining, by sintering, individual primary particles in secondary particles (aggregates of particles) in the form of granular particles (sometimes also simply referred to as granulated particles) or coated fine particles comprising fine particles bound on the periphery of core particles. Powder rapid prototyping manufacturing generally uses an energy source such as a laser, an electron beam and an arc and when the additive manufacturing material is irradiated with the above, high energy may be released to generate an impact on the additive manufacturing material. Due to the impact, mere granulated particles may collapse or primary particles may be scattered. In order to avoid such situation, the granulated particles are formed as so-called granulated sintered particles in which individual primary particles are bound by sintering. The granulated sintered particles are preferred because even when the particles are irradiated with an energy source such as a laser with higher intensity, collapse or scatter of the additive manufacturing material hardly occurs. This may lead to an increase of manufacturing speed without deterioration of manufacturing accuracy and quality of manufactured articles (for example, the laser scanning speed may be increased or there is no need to decrease the laser scanning speed), and thus is preferable.

(Granule Strength)

The granule strength of the granulated sintered particles that form the additive manufacturing material may be defined so as to be above 1 MPa. As a result of this, collapse or scatter of the granulated sintered particles due to the energy during manufacturing may be suitably suppressed. As a result, the material powder may be stably supplied to the manufacturing area and thus manufactured articles with high quality without unevenness may be manufactured. As an approximate target, for example, the granulated particles granulated and combined with a binder are considered to have a granule strength of less than 1 MPa. The granulated sintered particles have a granule strength of preferably 10 MPa or more, more preferably 50 MPa or more and particularly preferably 100 MPa or more (such as 200 MPa or more). However, according to the study carried out by the inventors of the present invention, an extremely high granule strength is not preferable because it would be difficult to sufficiently melt the additive manufacturing material. In addition, granulated sintered particles having an extremely high granule strength are obtained as a result of sintering that has been progressed until obtaining a structure similar to single particle that is not granulated, and thus have properties similar to those of spheroidized particles. From such a viewpoint, the granule strength is defined to be less than 10000 MPa. The granule strength is preferably 5000 MPa or less, more preferably 2500 MPa or less and particularly preferably 1000 MPa or less (such as 800 MPa or less).

The "granule strength" of the granulated sintered particles that form the additive manufacturing material as used herein may be the fracture strength of a particle measured on an electromagnetic force loading compression tester. Specifically, one granulated sintered particle is fixed between a pressure indenter and a pressure plate and a compression load by electromagnetic force is applied with a constant increment between the pressure indenter and the pressure plate. Compression is performed with a constant loading rate and the displacement of the measurement sample is measured. By processing the result of the displacement property of the measured sample on a dedicated programme, the strength value (fracture strength) may be calculated. In the present specification, 10 or more granulated sintered particles that form the additive manufacturing material are measured on a micro compression testing machine (produced by Shimadzu Corporation, MCT-500), and the arithmetic average of the measured fracture strengths is used as the granule strength. With respect to each granulated sintered particle, the fracture strength 6 [MPa] of the granulated sintered particle is calculated from the following equation: $\sigma=2.8 \times L/\pi/d^2$, wherein L [N] represents the critical load obtained by the compression test and d [mm] represents the average particle diameter.

In such an additive manufacturing material, there are voids between particles (typically primary particles) that form the first powder and particles (typically primary particles) that form the second powder. Then voids are formed between individual primary particles and primary particles are bound three-dimensionally. Because of this, the additive manufacturing material is advantageous as it is prone to receive energy from an energy source (heat source) and is prone to be dissolved. As a result, voids between secondary particles are easily eliminated and a dense manufactured article having a high degree of hardness that is close to a sintered compact (bulk material) produced by using, for example, a casting mould may be obtained.

Particularly, the additive manufacturing material contains not only the first powder containing a ceramic but also the second powder containing a metal that has a melting point generally lower than ceramics. In addition, voids (pores) are inevitably formed between individual particles that form granulated sintered powder. In other words, a plurality of primary particles is three-dimensionally bound through voids. As a result of this, in the additive manufacturing material, the second powder melts first and then the molten liquid of the second powder may wet and spread on the surface of the first powder. Alternatively, the second powder may incorporate the first powder dispersed in the matrix obtained by melting the second powder. As a result of this, melting of the first powder may be facilitated to provide a dense manufactured article. Alternatively, a dense manufactured article may be obtained that includes the ceramic phase dispersed in the metal phase.

Moreover, the powder material conventionally used for powder rapid prototyping manufacturing having a small average particle diameter (such as 20 μm or less) tends to have an increased resistance to flow and thus a decreased flowability because of an increased impact by the contact area between particles that form powder. In contrast, the additive manufacturing material described herein is formed with primary particles in the form of secondary particles even if the primary particles have a low average particle diameter, and thus may have preferable flowability according to the average particle diameter of secondary particles.

The additive manufacturing material includes sufficient voids between primary particles that form the granulated sintered particles. The term "void" in this context means a space that is larger than a space that is inevitably formed when, for example, primary particles are close-packed. The "void" may be a space that is 1.1 times (1.2 times) or more of a space that is inevitably formed when primary particles are close-packed. The void may be observed with, for example, a specific surface area and pore distribution analyser and the like.

By configuring the average particle diameter of the primary particles to be minute, the additive manufacturing material may be, for example, softened or melted at a temperature lower than the melting point of secondary particles per se that form the additive manufacturing material. This is a completely new finding that has not been predicted. Thus, the additive manufacturing material may be softened or melted with, for example, smaller energy (for example, laser output when a laser is used) than that was conventionally required in powder rapid prototyping manufacturing, enabling a reduction of the process cost. In addition, because of an increased softening or melting efficiency of secondary particles, a dense three-dimensional manufactured article having low porosity may be prepared without, for example, a reduction of laser scanning speed and rather with an increased laser scanning speed. As a result of this, a three-dimensional manufactured article that has properties close to, for example, a bulk of the additive manufacturing material may be prepared.

(Average Particle Diameter of the Additive Manufacturing Material)

The additive manufacturing material may have any average particle diameter without particular limitation and may have a size that is suitable for the specification of, for example, a powder rapid prototyping manufacturing machine used. For example, the size may be suitable for supply of the additive manufacturing material during powder rapid prototyping manufacturing. The upper limit of the average particle diameter of the additive manufacturing material may be, for example, above 100 µm when configuring the diameter to be higher. Typically, the upper limit may be 100 µm or less, preferably 75 µm or less, more preferably 50 µm or less and still more preferably 40 µm or less. When the additive manufacturing material has a decreased average particle diameter, the filling rate of the additive manufacturing material in, for example, the manufacturing area may increase. As a result, the density of the three-dimensional manufactured article may be suitably increased. In addition, the surface roughness (Ra) of the three-dimensional manufactured article may be decreased and an effect of improving dimension accuracy may also be obtained. Further, the additive manufacturing material of the present invention includes voids, and thus there is also an advantage of improving the solidification efficiency when the adhered additive manufacturing material is solidified during lamination manufacturing.

The lower limit of the average particle diameter of the additive manufacturing material is not particularly limited as far as the flowability of the additive manufacturing material is not affected. The lower limit may be, but is not limited to, for example 10 µm or less, 5 µm or less and the like when configuring the diameter to be lower. However, as the additive manufacturing material described herein has the form of secondary particles, and thus it is not always necessary to reduce the average particle diameter. Therefore, when the handling during formation of the additive manufacturing material and the flowability of the additive manufacturing material are taken into account, the lower limit of the average particle diameter may be 1 µm or more, suitably 5 µm or more, preferably 10 µm or more and more preferably, for example, 20 µm or more. When the additive manufacturing material has an increased average particle diameter, the additive manufacturing material may have increased flowability. As a result, the additive manufacturing material may be preferably supplied to a manufacturing machine and the prepared three-dimensional manufactured article may have a preferable finish, and thus it is preferable.

Generally, fine powder materials having an average particle diameter of, for example, less than about 10 µm have difficulty in control of the particle shape and have increased specific surface area, and thus may have decreased flowability. Therefore, when such a powder material is used for powder rapid prototyping manufacturing, it may often be difficult to planarize the powder material during supply thereof. Further, the powder material scatters due to the small mass thereof, and thus handling thereof may be difficult. In contrast, the additive manufacturing material described herein is formed with secondary particles obtained by three-dimensionally sintering more than one primary particle having low average particle diameter through voids. As a result of this, it is possible to increase the weight of particles while maintaining the form of primary particles. In addition, as described above, the concentration of components in the additive manufacturing material may be kept uniform even though the additive manufacturing material contains the first powder and the second powder having different composition from the first powder. As a result of this, it is possible to provide a novel additive manufacturing material for powder rapid prototyping manufacturing that has both advantages resulting from using primary particles having low average particle diameter and using secondary particles having high average particle diameter.

(Average Particle Diameter of Primary Particles)

Meanwhile, in the additive manufacturing material described herein, the first powder and the second powder that form secondary particles preferably have average particle diameters of, for example, 20 µm or less (less than 20 µm), more preferably 10 µm or less (less than 10 µm) and for example 10 µm or less. By reducing the average particle diameter of primary particles, it is possible to prepare a denser and finer three-dimensional manufactured article. The first powder and the second powder may have average particle diameters of, for example, 1 nm or more, more preferably 200 nm or more, and for example 500 nm or more. By reducing the average particle diameter of primary particles, it is possible to prepare a denser and finer three-dimensional manufactured article.

Generally, the first powder has higher melting point than the second powder and thus is less melted. Therefore, from the viewpoint of forming an additive manufacturing material that is more suitable for manufacturing, a preferable embodiment may be such that the average particle diameter $D_1$ of the first powder is lower than the average particle diameter $D_2$ of the second powder. The average particle diameter $D_1$ of the first powder and the average particle diameter $D_2$ of the second powder preferably fulfil, for example, $D_1 < D_2$, more preferably $D_1 \leq 0.7 \times D_2$ and particularly preferably $D_1 \leq 0.5 \times D_2$ without limitation. For example, $D_1 \leq 0.3 \times D_2$ may be configured. Alternatively, the average particle diameter $D_1$ of the first powder and the average particle diameter $D_2$ of the second powder may be preferably such that $0.05 \times D_2 \leq D_1$, more preferably $0.07 \times D_2 \leq D_1$ and particularly preferably $0.1 \times D_2 \leq D_1$.

The "average particle diameter" of the additive manufacturing material as used herein means, unless otherwise stated, a particle diameter at 50% of the cumulative value (50% volume average particle diameter; $D_{50}$) in the particle size distribution based on the volume as measured on a particle size distribution analyser based on the laser diffraction/scattering method. However, for a group of particles having an average particle diameter of, for example, less than 1 µm, the average particle diameter may be measured on the basis of the dynamic light scattering or electron microscopy. In this case, the average particle diameter as used herein is typically an arithmetic average of diameters corresponding to circles determined for planar view images (such as secondary electron images) of 100 or more particles observed by an observation means such as an electron microscope.

The "average particle diameter" of primary particles (the first powder and the second powder bound together) that form the additive manufacturing material may be, for example, a value calculated as a diameter (diameter corresponding to a sphere) of spherical particles calculated from the specific surface area. The average particle diameter of the primary particles (Dave) may be determined on the basis of the following equation: Dave=6/(ρSm), wherein Sm is the specific surface area and ρ is the density of the entire additive manufacturing material. The density ρ of the additive manufacturing material may be a value (weighted sum) obtained by calculating the compositions and proportions of the first powder and the second powder by the compositional analysis or the like of the additive manufacturing material and summing densities of materials that form the first powder and the second powder according to the compositional proportions thereof.

The specific surface area may be a value, for example, calculated according to the BET method from the amount of gas adsorbed such as $N_2$ measured according to the continuous flow method on a specific surface area analyser (produced by Micromeritics Instrument Corp., FlowSorb II 2300). The specific surface area may be measured according to the "Determination of the specific surface area of powders (solids) by gas adsorption-BET method" under JIS Z 8830: 2013 (ISO9277:2010).

<Specific Surface Area>

The specific surface area of the additive manufacturing material is not particularly limited; however, it is preferably, for example, above 0.1 $m^2$/g. Namely, it is preferable that the additive manufacturing material is mainly formed with secondary particles having a (extremely) high specific surface area. Specifically, as, for example, silica ($SiO_2$) has a specific gravity of 2.2 g/ml, a true sphere silica particle having a radius of r m has a specific surface area of $1.36/r \times 10^{-6}$ $m^2$/g. Accordingly, for example, a true sphere silica particle having a radius of 30 μm has a specific surface area of 0.045 $m^2$/g. Further, as α alumina ($Al_2O_3$) has a specific gravity of 3.98 g/ml, a true sphere alumina having a radius of r m has a specific surface area of $0.75/r \times 10^{-6}$ $m^2$/g. Accordingly, a true sphere alumina particle having a radius of 30 μm has a specific surface area of 0.025 $m^2$/g. Further, when commercially available molten and ground fine alumina powder is measured according to the "Determination of the specific surface area of powders (solids) by gas adsorption-BET method" under JIS Z 8830:2013 (ISO9277:2010), the result is about 0.1 $m^2$/g. In contrast, the additive manufacturing material described herein preferably has a specific surface area of 0.1 $m^2$/g or more. Because of such an increased specific surface area, the additive manufacturing material described herein may have such a shape (structure) that the surface conformation is three-dimensionally intricate and complex. Namely, it is possible to significantly reduce the substantial dimension (such as the thickness of the surface unevenness) without being restrained by the average particle diameter of the additive manufacturing material per se. Accordingly, by having such an extremely high specific surface area, a ceramic material having high melting point may effectively absorb the heat from a heat source of relatively low temperature such as a laser to achieve sufficient softening and melting. As a result, it is possible to provide an additive manufacturing material that allows efficient preparation of a three-dimensional manufactured article containing a ceramic.

Moreover, lamination may be achieved with heat at relatively low temperature, and thus lamination manufacturing at a temperature that may suppress grain growth may be achieved. In addition, the composition of the additive manufacturing material is hardly varied by heat even with secondary particles containing an element having a low melting point. Therefore, it is possible to conveniently control the composition of the prepared three-dimensional manufactured article. Thus, although the specific surface area of the secondary particles is not particularly limited, it is desirable that the specific surface area is high and is preferably 0.1 $m^2$/g or more.

<Range of Grain Size>

It is preferable that the range of grain size of the additive manufacturing material is appropriately selected according to the type of the machine and conditions used for powder rapid prototyping manufacturing. For example, specifically, the range of grain size of the additive manufacturing material may be appropriately adjusted so as to be 5 to 20 μm, 45 to 150 μm, 5 to 75 μm, 32 to 75 μm, 15 to 45 μm, 20 to 63 μm or 25 to 75 μm.

The range of grain size of the additive manufacturing material represents the size (particle diameter) and proportion (relative particle amount provided that the entire additive manufacturing material is regarded as 100% by volume) of particles contained in the group of particles that forms the additive manufacturing material. The "range of grain size" is an index of the width (extent) from the lower limit to the upper limit of diameters of particles in the additive manufacturing material. The lower limit of the range of grain size as used herein means that the proportion of particles having particle diameters at or lower than the value in the additive manufacturing material is 5% or less. The upper limit of the range of grain size means that the proportion of particles having particle diameters at or above the value in the additive manufacturing material is 5% or less. The grain size distribution of the additive manufacturing material may be measured on a suitable grain size distribution analyser according to the grain size of the additive manufacturing material. For example, the grain size distribution may be determined on, for example, a RO-TAP tester (see JIS R 6002) or an analyser employing laser diffraction/scattering. For example, the additive manufacturing material having, for example, a range of grain size of 5 to 75 μm means that the proportion of particles having particle diameters of 5 μm or less is 5% or less and the proportion of particles having particle diameters of 75 μm or more is 5% or less.

<Circularity>

It is further preferable that the granulated sintered particles that form the additive manufacturing material described herein have an average circularity of less than 1.5 (such as 1 or more and less than 1.5). The average circularity is employed as an index that may indirectly represent an average sphericity of secondary particles that form the additive manufacturing material and means an average circularity when the secondary particles are viewed as a plane from an arbitrary direction. Therefore, the average circularity does not necessarily intend to mean that the secondary particles are close to a two-dimensional true circle but intends to mean that the secondary particles are substantially close to a three-dimensional true sphere.

Particularly, the additive manufacturing material contains the first powder containing a ceramic. Generally, a ceramic without spheroidization treatment has high crystallinity and thus tends to provide the shape of particles that is the same as the external shape of the crystal system. Among others, ceramic particles which are a ground material have strong tendency as above because the particles are crushed along the crystal planes. In addition, ceramic particles can, even when the particles do not exhibit the external shape of the ideal crystal system, exhibit the shape close to polyhedrons which are combinations of specific crystal planes as an external shape thereof. Therefore, when first powder formed from secondary particles containing a ceramic that has edges, corners (which may be vertices) and angular parts originating from the crystal system is used as it is, the flowability tends to decrease. Namely, secondary particles containing a ceramic may interlock each other during supply to the manufacturing area to make planarization difficult.

In contrast, the additive manufacturing material contains, in addition to the first powder containing a ceramic, the second powder containing a metal. In addition, because of being in the form of secondary particles, the external shape is close to a true sphere and thus there is less effect by, for example, crystal planes, edges, corners or angular parts that reflect the crystallinity of the ceramic that forms the particles. As a result of this, the additive manufacturing material may have a significantly increased flowability even though the additive manufacturing material contains a ceramic. In other words, in the additive manufacturing material described herein, the first powder may be in the form to which high crystallinity of the ceramic is reflected, and even when the first powder has the external shape of, for example, prism or mass, high flowability may be secured if the above average circularity is satisfied. The average circularity may be an index that may reflect the average sphericity that may not be represented by an index such as the average aspect ratio. Accordingly, the average circularity of the additive manufacturing material of which flowability is increased in a planarization step of powder rapid prototyping manufacturing is preferably as close to 1 as possible and may be 1 or more. The average circularity is preferably 2.7 or less, more preferably 2.0 or less, 1.5 or less and may be, for example, 1.2 or less.

The "circularity" of the granulated sintered particles that form the additive manufacturing material as used herein means an arithmetic average of circularities determined for planar view images (such as secondary electron images) of 100 or more secondary particles observed by an observation means such as an electron microscope. The circularity is defined according to the following equation based on the boundary length which corresponds to the length of the contour of a secondary particle and the area surrounded by the contour in the planar view image of the secondary particle. The circularity is an index that tends to reflect the surface shape smoothness of secondary particles, and geometrical circle (true circle) has a circularity of 1 and as the shape departs from true circle, the circularity becomes higher than 1. The average circularity may be determined by, for example, analysing an electron microscopic image obtained at an appropriate magnification on an image processing software or the like.

Circularity=(Boundary length)/(4×π×Area)

<Aspect Ratio>

With regard to the external shape of the granulated sintered particles that form the additive manufacturing material, it is more preferable that the average aspect ratio in the planar view is less than 1.4. As described above, in secondary particles having an average circularity closer to 1, the circularity may reflect the surface shape rather than the shape of the whole secondary particles. In other words, when evaluating secondary particles close to a true circle, the circularity tends to increase beyond the extent of change in the external shape of whole secondary particles if the contour of the secondary particle in the planar view becomes complicated at the micro level. Therefore, by defining the external shape of secondary particles by the aspect ratio in addition to the circularity, secondary particles may be obtained of which external shape as a whole is close to a true sphere, namely close to a true circle in the planar view.

The average aspect ratio is, by taking the flowability of the additive manufacturing material into account, preferably 1.5 or less and more preferably 1.3 or less. The average aspect ratio may be, for example, 1.15 or less and desirably 1 or close to 1.

The "aspect ratio" as used herein means an arithmetic average of aspect ratios determined for planar view images (such as secondary electron images) of 100 or more secondary particles observed by an observation means such as an electron microscope. The aspect ratio may be defined by a/b, wherein a is the length of the long axis and b is the length of the short axis of the ellipse corresponding to the secondary particle. The ellipse corresponding to the secondary particle means an ellipse that has the same area and the same first-order and second-order moments as the secondary particle. The average aspect ratio may be determined by, for example, analysing an electron microscopic image obtained at an appropriate magnification on an image processing software or the like.

<Fractal Dimension>

It is also a preferable embodiment in which the granulated sintered particles that form the additive manufacturing material have an average fractal dimension of less than 1.5. Such secondary particles may have surface shapes that are complex at the micro level. Therefore, by defining the complex surface shape of the particles by a variety of indices, the additive manufacturing material may be obtained of which external shape is further close to a true sphere. The fractal dimension is an index that is widely and generally used in order to measure a complex surface shape of each particle, and the average fractal dimension may be a suitable index for measuring the surface smoothness of the additive manufacturing material described herein. By defining the average fractal dimension to be less than 1.5, the additive manufacturing material having a further improved flowability may be attained. The average fractal dimension is preferably 1.1 or less and more preferably 1.05 or less when the flowability of the additive manufacturing material is taken into account.

The "fractal dimension" as used herein means an arithmetic average of fractal dimensions determined for planar view images (such as secondary electron images) of 100 or more secondary particles observed by an observation means such as an electron microscope. The fractal dimension as used herein is a value determined according to the divider method and is defined as a slope of a linear portion of the function connecting the boundary length and logarithm of the stride length of a secondary particle in a planar view image of the secondary particle. The measured value of the fractal dimension is a value of 1 (=solid line) or more and less than 2 (=plane) and the value closer to 1 means that the secondary particle has a smoother surface. The average fractal dimension may be determined by, for example, analysing an electron microscopic image obtained at an appropriate magnification on an image processing software or the like.

<Repose Angle>

It is also a preferable embodiment in which the additive manufacturing material described herein has a repose angle of less than 39 degrees. The repose angle is one of the indices that have been conventionally and widely used to represent the flowability of powder. The repose angle may also be an index that may practically reflect spontaneous flowability during, for example, transport of the additive manufacturing material through a supplying machine and a manufacturing machine. Therefore, by defining the repose angle to be low, the additive manufacturing material having high flowability may be attained. As a result of this, the additive manufacturing material may allow preparation of a homogeneous three-dimensional manufactured article with preferable productivity.

The repose angle is preferably 36 degrees or less and more preferably 32 degrees or less when the flowability of the additive manufacturing material is taken into account. The repose angle may further be, for example, 30 degrees or less. The lower limit of the repose angle is not particularly limited. However, when the repose angle is too low, the additive manufacturing material may easily be scattered or the control of the supply quantity of the additive manufacturing material may be difficult. Therefore, the repose angle of 20 degrees or more may be exemplified as an approximate target.

<Flow Function>

Without particular limitation, it is preferable that the additive manufacturing material described herein has a flow function of 5.5 or more.

The above repose angle is an index that allows evaluation of flowability of the additive manufacturing material under no load. In contrast, the flow function is to evaluate the flowability of the additive manufacturing material by measuring the shear stress while sealing and pressurising the additive manufacturing material and may be an index that may practically represent the handleability of the additive manufacturing material. Therefore, according to the above configuration, the additive manufacturing material having an average particle diameter of, for example, less than 30 μm may be considered to have high flowability, and the additive manufacturing material that allows preparation of a three-dimensional manufactured article with higher productivity may be provided.

(Production Method of the Additive Manufacturing Material)

The production method of the additive manufacturing material according to the present embodiment is not particularly limited as far as primary particles are three-dimensionally sintered through voids. For example, production of the additive manufacturing material by granulation/sintering method is hereinafter described as a suitable example. However, the production method of the additive manufacturing material described herein is not limited thereto.

(Granulation/Sintering Method)

The granulation/sintering method is a process for sintering individual particles by granulating starting material particles (which may be the first powder and the second powder) into the form of secondary particles followed by sintering. Upon granulation, various well-known granulation methods may be appropriately used. Examples of the granulation method that may be used include granulation methods such as dry granulation and wet granulation. Specific examples include tumbling granulation, fluidized bed granulation, agitating granulation, crushing granulation, melt granulation, spray granulation, microemulsion granulation and the like. Among others, spray granulation is a suitable granulation method.

According to the spray granulation, the additive manufacturing material may be produced, for example, according to the following procedures. Thus, a first powder and a second powder having desired compositions and dimensions are first prepared. The surfaces thereof may be stabilised with a protecting agent and the like, if necessary. The thus stabilised starting material powder particles are dispersed in an appropriate solvent together with, for example, a binder, optionally spacer particles containing an organic material and the like, thereby preparing a spray liquid. The starting material particles may be dispersed in the solvent by using, for example, a mixer or a dispersing machine such as a homogenizer and an agitator with blades. Accordingly, the first powder and the second powder are uniformly dispersed in a spray liquid. The spray liquid is then sprayed from an ultrasonic sprayer and the like to form droplets. The droplets on, for example, a gas flow are allowed to pass through a continuous oven to remove the solvent component and dry. Accordingly, secondary particles which are the first powder and the second powder three-dimensionally bound together through voids may be obtained.

The thus granulated secondary particles are then sintered, thereby sintering the first powder and the second powder in the secondary particles. Accordingly, starting material particles may be firmly bound (sintered) together. In the granulation/sintering method, droplets which are ultrasonically sprayed in the above granulation are dried and then may be sintered while passing though the continuous oven on a gas flow. Specifically, while transporting the ultrasonically sprayed droplets through the continuous oven, the solvent component is removed by drying in a low-temperature zone provided at relatively upstream of the oven and then the droplets are sintered in a high-temperature zone provided at relatively downstream of the oven. The granulated starting material particles are sintered at mutual contact points and sintered while almost maintaining the granulated shape. The binder is eliminated during sintering. In the system in which spacer particles are used, the spacer particles are also eliminated during sintering. Accordingly, the additive manufacturing material formed from particles in the form of secondary particles in which primary particles are sintered through voids may be obtained. The granulated particles are transported by a gas flow from droplets to sintering. Thereby granulated sintered particles which are approximately spheres may be obtained.

In the production process, granulated particles may be prepared by using spacer particles in addition to the starting material particles. When sprayed droplets are dried, the starting material particles and the binder are in the uniformly mixed state and the starting material particles are bonded by the binder to form mixed particles. Therefore, in the system in which spacer particles are used together with the starting material particles, the starting material particles and the spacer particles in the uniformly mixed state are bonded by the binder to form mixed particles. When the mixed particles are sintered, the binder (and the spacer particles) is eliminated (burns off) and the starting material particles are sintered. As a result of this, secondary particles in the form of primary particles bound through sufficient voids are formed.

Figure 2:
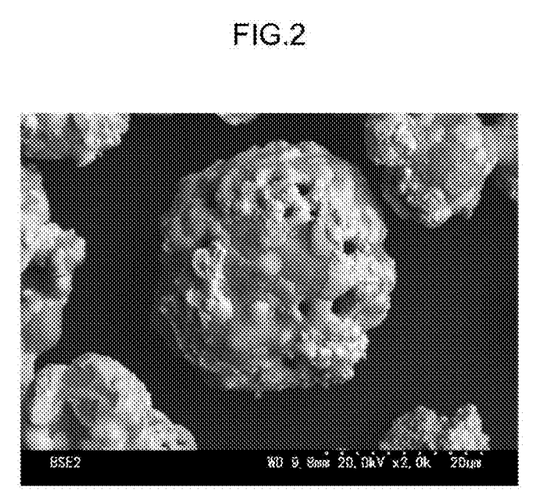
FIG. 2 is a scanning electron microscope (SEM) image of an additive manufacturing material according to another embodiment.

Upon sintering, some of the starting material particles (typically second powder) may form, depending on the composition or size thereof, a liquid phase to contribute to the binding with other particles. Therefore, primary particles may have a bigger or smaller average particle diameter than the starting material, namely starting material particles. For example, FIG. 2 is a SEM image exemplifying the additive manufacturing material at a relatively advanced stage of sintering. The granulated sintered particles in this figure have a high proportion of metal powder and are in a relatively advanced stage of sintering. Therefore, primary particles at the area where metal powder is significantly melted are relatively densely sintered. However, it is possible that the granulated sintered particles clearly contain voids which are formed during granulation. As described above, primary particles in the additive manufacturing material, namely the first powder and the second powder may have almost the same dimensions and shapes as starting material particles or primary particles may grow, bind or be divided by sintering of starting material particles. From drying to sintering, components other than starting material particles may be eliminated and the starting material particles may shrink due to sintering, and thus the obtained secondary particles may have a significantly smaller average particle diameter than droplets. The average particle diameters of the secondary particles and primary particles and the size and proportion of voids formed between the primary particles may be appropriately designed according to the form of desired secondary particles. However, it is considered that granulated particles which are completely devoid of voids between primary particles can hardly exhibit the effect of the granulated sintered particles within the meaning of the invention described herein. Therefore, in the invention described herein, it is preferable that granulated sintered particles have voids or pores (open pores) connected to at least the outside even at an advanced stage of sintering.

In the production step, it is preferable that, but is not limited to, the prepared spray liquid contains starting material particles at a concentration of 10 to 40% by mass. Examples of the binder to be added include carboxymethylcellulose, polyvinylpyrrolidone, polyvinylpyrrolidone and the like. The binder added is preferably prepared at a proportion of 0.05 to 10% by mass relative to the mass of the starting material particles. The sintering environment may be, but is not limited to, in the atmosphere, under vacuum or in an inert gas atmosphere and it is preferable to sinter at a temperature of 600° C. or higher and 1700° C. or lower. Generally, the granule strength may be controlled by adjusting the sintering temperature or, for example, by adjusting the sintering period. Typically, when the sintering temperature is high and/or the sintering period is long for the material used, the granule strength of the obtained additive manufacturing material may be increased due to an advance of sintering. The temperature during sintering may be, although the temperature may depend on the particle diameter of the primary particles, generally and suitably adjusted to a temperature of, for example, about (the melting point of the metal in the second powder)×0.8 to 0.95. When, particularly, spacer particles containing an organic material and the like, a binder and the like are used, sintering may be performed in an atmosphere containing oxygen for the purpose of removing the organic material in the granulated particles. The produced secondary particles may be disintegrated or classified, if necessary.

(Production Method of Three-Dimensional Manufactured Article)

The thus obtained additive manufacturing material may be applied to various types of powder rapid prototyping manufacturing. As a suitable example of the production method of a three-dimensional manufactured article described herein, powder rapid prototyping manufacturing in which selective laser sintering (SLS) is mainly employed is described hereinbelow.

The method for producing a three-dimensional manufactured article described herein generally includes the following steps:

(1) supplying an additive manufacturing material to a manufacturing area of a powder rapid prototyping manufacturing machine;

(2) the supplied additive manufacturing material is uniformly and thinly deposited onto the manufacturing area, thereby forming a thin layer of the additive manufacturing material;

(3) applying, to the formed thin layer of the additive manufacturing material, energy for binding (adhering) the additive manufacturing material, thereby bonding the additive manufacturing material; and (4) supplying fresh additive manufacturing material onto the solidified additive manufacturing material (the above step (1)), and then stacking layers by repeating the steps (2) to (4), thereby obtaining a desired three-dimensional manufactured article.

Figure 3:
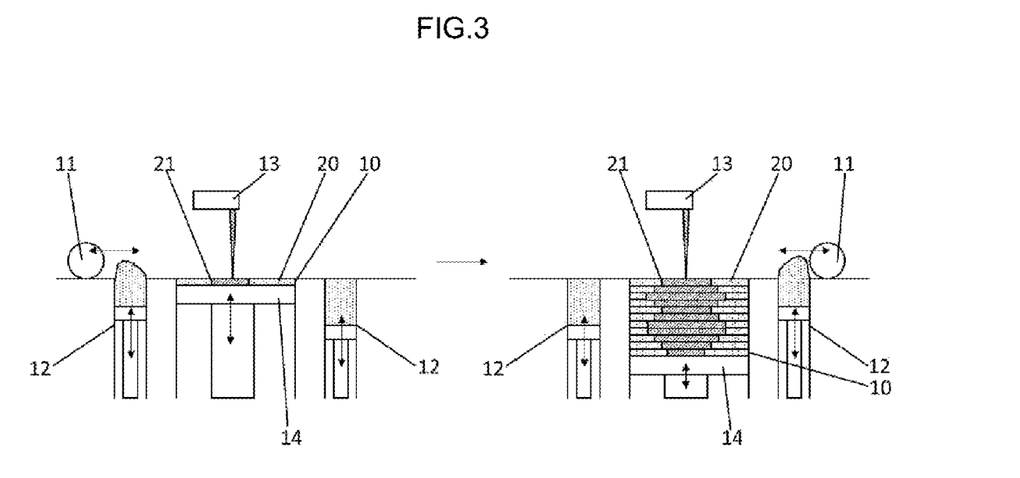
FIG. 3 is a schematic cross-sectional view illustrating a machine on which powder rapid prototyping manufacturing is performed.

FIG. 3 shows an example of a schematic view of the lamination manufacturing machine for powder rapid prototyping manufacturing, which includes, as a basic structure, a manufacturing area 10 which is a space in which powder rapid prototyping manufacturing is performed; a stock 12 for retaining the additive manufacturing material; a wiper 11 for assisting supply of the additive manufacturing material to the manufacturing area 10; and a solidification means (energy supply means such as a laser oscillator) 13 for solidifying the additive manufacturing material. The manufacturing area 10 typically has a manufacturing space of which outer circumference is surrounded below a manufacturing surface and has, in the manufacturing space, a lifting table 14 that can move up and down. The lifting table 14 can move downward a predetermined thickness Δt1 at a time and a desired article is manufactured on the lifting table 14. The stock 12 is disposed beside the manufacturing area 10 and includes a bottom plate (lifting table) that can move up and down by a cylinder or the like in, for example, a retention space of which outer circumference is surrounded. By moving up the bottom plate, a predetermined amount of the additive manufacturing material may be supplied (extruded) onto the manufacturing surface.

1. Supplying the Additive Manufacturing Material

In such a lamination manufacturing machine, an additive manufacturing material 20 is supplied to the manufacturing area 10 while the lifting table 14 is a predetermined thickness Δt1 below the manufacturing surface, thereby enabling preparation of a layer of the additive manufacturing material 20 having a predetermined thickness Δt1.

2. Formation of a Thin Layer of the Additive Manufacturing Material

By driving the wiper 11 on the manufacturing surface upon this occasion, the additive manufacturing material extruded from the stock 12 may be supplied onto the manufacturing area 10 and the upper surface of the additive manufacturing material may be planarized to form a homogeneous layer of the additive manufacturing material 20.

3. Binding of the Additive Manufacturing Material

Energy may be then applied only to the solidification region corresponding to the slice data of the first layer on, for example, the thus-formed first additive manufacturing material layer 20 via the solidification means 13 and the additive manufacturing material may be melted or sintered so as to have a desired cross-section shape, thereby forming the first powder solidified layer 21.

4. Repetitive Lamination Manufacturing

Thereafter, the additive manufacturing material is again supplied after lowering the lifting table 14 by a predetermined thickness Δt1 and flattened with the wiper 11, thereby forming the second additive manufacturing material layer 20. A heat source, a solidification composition or the like is then applied only to the solidification region corresponding to the slice data of the second layer on the additive manufacturing material layer 20 and the additive manufacturing material is solidified via the solidification means 13 to form the second powder solidified layer 21. On this occasion, the second powder solidified layer 21 and the first powder solidified layer 21—the lower layer—are unified to form a laminate including up to the second layer.

The lifting table 14 is then lowered by a predetermined thickness Δt1 to form another additive manufacturing material layer 20, and a heat source, a solidification composition or the like is applied via the solidification means 13 to form a powder solidified layer 21 at a desired site. By repeating the process, a desired three-dimensional manufactured article may be produced.

A means for solidifying the additive manufacturing material to be selected is, for example, a method for ejecting a composition for solidifying the additive manufacturing material by ink-jet, a method for melting/solidifying (including sintering) the additive manufacturing material with heat by a laser or irradiation of an ultraviolet ray if the additive manufacturing material is photocurable so as to conform with the photocurable property thereof. A more preferable means is the method for melting/solidifying the additive manufacturing material, and specifically when the means for solidifying the additive manufacturing material is a laser, a carbon dioxide gas laser or a YAG laser, for example, may be suitably used. When the means for solidifying the additive manufacturing material is ejection of a composition by ink-jet, a composition containing, as an adhesive, polyvinylpyrrolidone, polyvinyl alcohol, polyvinyl butyral, polyacrylic acid, a polyacrylic acid derivative, polyamide or the like, or a composition containing, for example, a polymerization initiator and the like may be used. When a photocurable additive manufacturing material is used, an excimer laser (308 nm), a He—Cd laser (325 nm) or an Ar laser (351 to 346 nm) having an ultraviolet wavelength region, and when a visible light-curable resin is used, an Ar laser (488 nm) or the like may be used. Namely, it is preferable to select an appropriate means for solidifying the additive manufacturing material according to the properties of the additive manufacturing material used.

SLS is a technique for manufacturing a three-dimensional structure by repeating procedures of scanning a laser over a powder layer of deposited additive manufacturing material based on the slice data generated from 3D CAD or the like and melting/solidifying the powder layer into a desired shape cross-section by cross-section (slice data by slice data) to stack the layers. EBM is a technique for manufacturing a three-dimensional structure by selectively melting/solidifying the powder layer with an electron beam based on the slice data similarly prepared from 3D CAD or the like to stack the layers. Both techniques include the step of supplying a starting material of the structure, an additive manufacturing material, at a predetermined manufacturing site. Particularly in SLS and EBM, it is required to repeat a planarization step in which the additive manufacturing material having a thickness corresponding to the thickness of one cross-section is uniformly and thinly deposited throughout the manufacturing area on which the structure is manufactured. In the planarization step of the additive manufacturing material, flowability of the additive manufacturing material is an important parameter and significantly affects the finish of the prepared three-dimensional manufactured article. With regard to this, the additive manufacturing material for powder rapid prototyping manufacturing of the present invention has preferable flowability, and thus may prepare a three-dimensional manufactured article with preferable finish. It is also possible to manufacture a dense three-dimensional manufactured article having less pores by laser beam irradiation. On this occasion, a reduction of the laser irradiation speed is not particularly required. Accordingly, manufactured articles containing a ceramic may be more densely and rapidly manufactured than in the past.

Laser metal deposition is, specifically, a technique in which an additive manufacturing material is provided at a desired site of a structure and irradiating with a laser beam to melt/solidify the additive manufacturing material and perform cladding on the site. When, for example, a physical deterioration such as wear is generated in a structure, the procedure allows cladding at the deteriorated site and the like by supplying to the deteriorated site an additive manufacturing material which is a material that composes the structure or a reinforcing material and melting/solidifying the additive manufacturing material. Cladding of the additive manufacturing material containing a ceramic may be performed so as to achieve high density and hardness.

The above embodiments may be modified as follows.

The additive manufacturing material and the secondary particles that form the additive manufacturing material and further primary particles that form the secondary particles may contain a component other than the main component such as inevitable impurities or additives. Namely, the purity is not particularly limited. However, for an application of, for example, forming a three-dimensional manufactured article having high functionality, it is preferable to avoid inclusion of an unintended substance (element) and it is preferable that the additive manufacturing material has high purity. From such viewpoints, it is preferable that the secondary particles and the primary particles that form the secondary particles have high purities. For example, the purity is preferably 95% by mass or more, further 99% by mass or more, more preferably 99.9% by mass or more such as 99.99% by mass or more.

The additive manufacturing material may contain another element (for example, for a ceramic, a transition metal element or an element such as Na, K and Rb) for the purpose of, for example, adjusting colour tone of a three-dimensional manufactured article to be formed or may contain another element for the purpose of increasing the functionality. Some of the elements that form the additive manufacturing material may be contained in the form of ions, complexes and the like.

While the additive manufacturing material is powder formed from granulated particles (typically having voids (pores)) having the form of secondary particles in which primary particles are three-dimensionally bound, the additive manufacturing material may contain particles having the form other than secondary particles. However, it is preferable that the content of the particles other than secondary particles is as low as possible. The reasons for this are, firstly, the present invention is based on the finding that by using an additive manufacturing material that is formed from secondary particles in which primary particles are three-dimensionally bound through voids for powder rapid prototyping manufacturing, manufactured articles that are denser than in the past may be manufactured. Therefore, when the ratio of the secondary particles in the specific form is increased relative to the total amount of the additive manufacturing material, the effect of the present invention is increased. In other words, when the ratio of the secondary particles in the specific form is deceased relative to the total amount of the additive manufacturing material, the effect of the present invention is less exhibited.

The secondary particles in the specific form of the present invention exhibit another preferable effect based on the following idea. For example, when the additive manufacturing material is prepared by mixing more than one type of single particles such as metal particles and ceramic particles, due to the difference in the specific gravity, particles formed from a material having a higher specific gravity tend to go below and particles having a lower specific gravity tend to go above, thereby generating a deviation of components in the additive manufacturing material. In contrast, the secondary particles in the specific form of the present invention have a uniform specific gravity and thus a deviation of components in the additive manufacturing material hardly occurs and thus the produced three-dimensional manufactured article has improved finish even when secondary particles are formed from cermet particles in which metal particles and ceramic particles are mixed or secondary particles are formed by mixing more than one type of material particles. From this point of view, it is preferable that the ratio of the secondary particles in the specific form relative to the total amount of the additive manufacturing material is high. Therefore, the lower limit of the content of the secondary particles relative to the additive manufacturing material is preferably 90% by weight and more preferably 95% by weight. The upper limit is generally 98% by weight and may be appropriately adjusted by mixing a component other than the secondary particles such as an additive to an extent that does not deteriorate the effect of the present invention.

EXAMPLES

Examples pertaining to the present invention are hereinafter described. However, it is not intended that the present invention is limited to those described in Examples below.

As ceramic powder (first powder), powders of tungsten carbide (WC) having an average particle diameter of 3.0 µm and chromium carbide (CrC) having an average particle diameter of 4.5 µm were prepared. As metal powder (second powder), powders of cobalt (Co) having an average particle diameter of 2 µm and nickel-chromium alloy (Ni-20% Cr) having an average particle diameter of 9 µm were prepared.

The prepared ceramic powder and metal powder were compounded at the proportions indicated in Table 1, mixed and granulated followed by sintering to prepare granulated sintered powder. Specifically, ceramic powder and metal powder were mixed at predetermined compositions and dispersed in a solvent (such as a mixed solvent of water and an alcohol) together with 3% by mass of binder (PVA: polyvinyl alcohol) relative to 100% by mass of the mixed powder, thereby preparing a slurry. The slurry was then granulated into the shape of droplets followed by drying and sintering on a spray granulating machine and a drying/sintering oven and the like to produce granulated sintered particles (secondary particles). The drying temperature of droplets was 200° C. and the sintering temperature was about 90% (0.9×Tm° C.) of the melting point (Tm) of metal in the metal powder used. In Examples having the same proportions of the ceramic powder and the metal powder, the sintering temperature in the Example with the smallest number was 0.9×Tm° C. and the sintering temperature was increased by 10° C. with an increment of the number of Example. The granulated sintered particles were classified, if necessary, thereby obtaining additive manufacturing materials (Examples 1 to 23).

The obtained additive manufacturing materials were measured for the average particle diameter, the granule strength and the bulk density and the results thereof are indicated in Table 1.

[Average Particle Diameter]

The average particle diameter of additive manufacturing materials was the $D_{50}$ particle diameter measured on, similar to the average particle diameter of starting material powders, a laser diffraction/scattering particle size analyser (produced by Horiba Ltd., LA-300). Additive manufacturing materials were classified (sieved), if necessary, to adjust the average particle diameter to 30 µm. The results of measurements of the average particle diameter of granulated sintered particles are indicated under "$D_{50}$" in Table 1.

[Granule Strength]

The granule strength of additive manufacturing materials was determined as follows: arbitrary 10 granulated sintered particles were selected from each additive manufacturing material and the fracture strength of each of the granulated sintered particles was measured on a micro compression testing machine (produced by Shimadzu Corporation, MCT-500) and an arithmetic average thereof was calculated. Specifically, for each granulated sintered particle, the granule strength $\sigma$[MPa] of the granulated sintered particle was the value calculated according to the following equation: $\sigma = 2.8 \times L/\pi/d^2$, wherein L [N] represents the critical load obtained by the compression strength test and d [mm] represents the average particle diameter. The critical load is the magnitude of compression load applied to a granulated sintered particle at the time of collapse (at the time of a sudden increase of the displacement of the pressure indenter) of the granulated sintered particle to which compression load increasing at a constant rate was applied from a pressure indenter to the granulated sintered particle. The results of measurements of the granule strength of granulated sintered particles are indicated under "Granule strength" in Table 1.

[Bulk Density]

Bulk density adopted is the value measured according to "Metallic powders-Determination of apparent density" under JIS Z2504:2012. Specifically, a container of a predetermined volume is filled with powder free-flowing from an orifice of a diameter of 2.5 mm, and the mass of the powder is measured to calculate the bulk density. In the present specification, the bulk density adopted was the value measured with JIS bulk specific gravity analyser for metal powder (produced by Tsutsui Scientific Instruments Co., Ltd.).

[Select Laser Melting (SLM)]

The prepared additive manufacturing materials were subjected to lamination manufacturing by a powder rapid prototyping manufacturing process, select laser melting, thereby obtaining three-dimensional manufactured articles. For lamination manufacturing, a laser sintering powder rapid prototyping manufacturing system (produced by SLM Solutions Group AG, SLM125HL) was used. In present Examples, a substrate was provided in a manufacturing area (manufacturing table) of the powder rapid prototyping manufacturing system and manufactured articles were manufactured on the substrate to facilitate visual observation of manufactured articles. The substrate used was an alumina plate. Specifically, each additive manufacturing material was supplied on the alumina plate in the manufacturing area at a thickness of 50 µm per layer and the additive manufacturing material was planarized with a wiper attached to the machine to form a deposited layer (thin layer) of the additive manufacturing material. The thin layer of the additive manufacturing material was two-dimensionally irradiated with a fibre laser, thereby forming a layer-shaped manufactured article (first layer). The step of supplying the additive manufacturing material and planarization and the step of laser irradiation were repeated more than once to obtain a three-dimensional manufactured article (design: 20 layers (1 mm)). The process conditions were as follows: the laser focus was about Ø 150 μm, the laser output was 100 W, the laser scanning speed was 300 mm/sec, the temperature environment was normal temperature and the atmosphere surrounding the additive manufacturing material was Ar gas.

[Porosity]

As an index for evaluating the finish of prepared three-dimensional manufactured articles, the three-dimensional manufactured articles were measured for porosity. The porosity determined was the value measured by image analysis on polished cross-sections sectioned in the direction of manufacturing (thickness direction) of each three-dimensional manufactured article. Specifically, an image of the cross-section of a three-dimensional manufactured article was obtained, binarization was performed with an image analysis software to separate the cross-section of the three-dimensional manufactured article to a pore section and a solid phase section (manufactured section of the manufactured article), and the proportion of the area of the pore section in the total cross-sectional area was calculated as porosity.

Figure 4A:
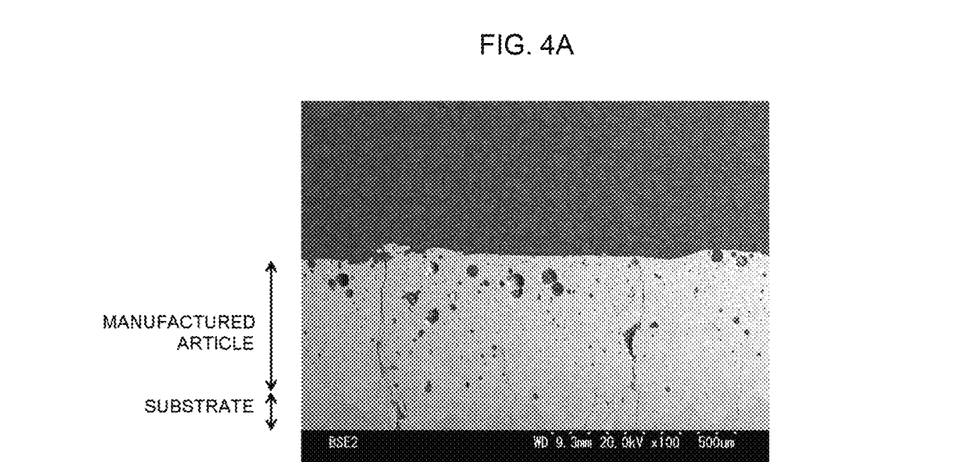
Figure 4B:
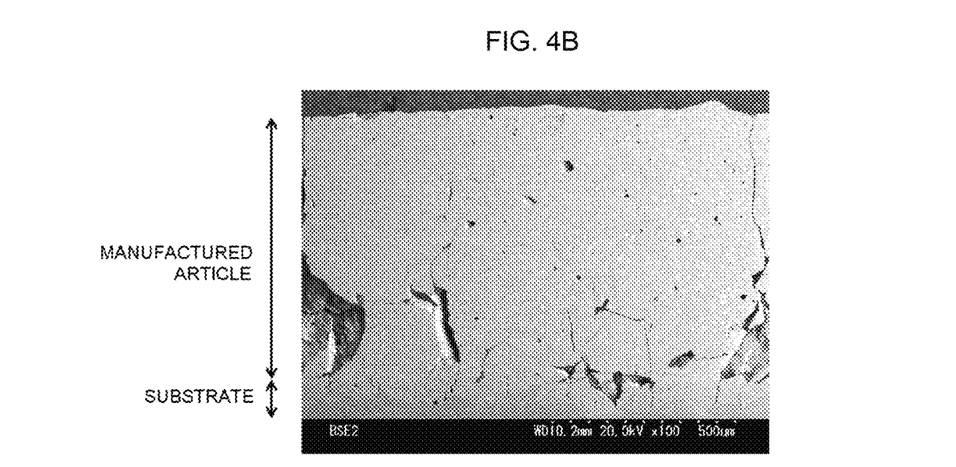

The porosity was measured with an observation image (which may suitably be any of a secondary electron image, a compositional image or an X-ray image) from a scanning electron microscope (SEM; produced by Hitachi High-Technologies Corporation, S-3000N). For reference, SEM images of manufactured articles of Example 1 and Example 6 are shown in FIGS. 4(a) and (b) in sequence. The image analysis software used was Image-Pro (produced by Media Cybernetics, Inc.). The results of measurements of the porosity of three-dimensional manufactured articles are shown under "porosity" in Table 1. The porosity of 10% or less was evaluated as "O", the porosity of above 10% and 20% or less was evaluated as "Δ" and the porosity of above 20% was evaluated as "X". None of the present embodiments was evaluated as "Δ".

[Uniformity]

By SEM observation carried out during measurement of the porosity, the uniformity of the texture of the manufactured articles was examined. Specifically, during SEM observation of cross-sections of manufactured articles containing ceramic and metal, generation of air bubbles and size and extent of dispersion of ceramic phase and metal phase in microstructures were observed. The samples were evaluated as "O" when the distribution of air bubbles was even and it could be judged that ceramic phase and metal phase had almost uniform size and dispersion, and the samples were evaluated as "X" when the distribution of air bubbles was apparently uneven and it could be judged that ceramic phase and metal phase did not have uniform size or distribution. The results are indicated in Table 1.

[Hardness]

Each manufactured article was measured on the basis of Vickers hardness test method under JIS Z2244:2009 and JIS R1610:2003. Specifically, by using a micro hardness tester (produced by Shimadzu Corporation, HMV-1), the surface of the three-dimensional manufactured article was indented with a diamond indenter having a facing angle of 136° at a testing force of 1.96 N and from the resulting indentation, Vickers hardness (Hv0.2) was calculated. Vickers hardness (Hv0.2) was also calculated for bulk material surfaces of the additive manufacturing materials from which the three-dimensional manufactured articles were obtained. The results are indicated under "Hardness" in Table 1.

[Manufacturing Thickness Per Layer]

As an index for evaluating manufacturing accuracy and manufacturing speed, the manufacturing thickness per scan of laser (namely per layer) was determined. The manufacturing thickness per layer was the value calculated by measuring the total thickness of the obtained manufactured article and dividing the same by the number of stacked layers (the number of laser scans in the thickness direction). The total thickness of the manufactured article was obtained by measuring the thickness of the polished cross-section of the manufactured article sectioned in the manufacturing direction (thickness direction) during SEM observation performed during measurement of the porosity described above. The total thickness of the manufactured article was obtained by measuring at 3 or more points per visual field for 3 or more visual fields of SEM observation images per manufactured article and averaging the results. The results are indicated under "Thickness per layer" in Table 1.

TABLE 1

| | | First powder (ceramic) | | Second powder (metal) | | Powder material (granulated) | | | Manufactured article | | | | |
|---|---|---|---|---|---|---|---|---|---|---|---|---|---|
| Example | Type | Composition (% by mass) | Metal powder | Composition (% by mass) | $D_{50}$ (μm) | Granule strength (MPa) | Bulk density (g/cm$^3$) | Porosity (%) | Hardness Hv0.2 | Uniformity | Thickness per layer (μm) | Manufacturing characteristics |
| 1 | WC | 90 | Co | 10 | 30 | 1 | 4.7 | 20 | 700 | X | 15 | X |
| 2 | | 85 | | 15 | 30 | 300 | 4.7 | 8.0 | 1200 | O | 40 | ⊕ |
| 3 | | 70 | | 30 | 30 | 300 | 4.0 | 4.0 | 1300 | O | 45 | ⊕ |
| 4 | | 50 | | 50 | 30 | 10000 | 4.2 | 12 | 1000 | O | 30 | X |
| 5 | | 50 | | 50 | 30 | 5000 | 4.0 | 3.0 | 1500 | O | 41 | ⊕ |
| 6 | | 50 | | 50 | 30 | 100 | 3.6 | 0.5 | 1500 | O | 45 | ⊕ |
| 7 | | 50 | | 50 | 30 | 10 | 3.4 | 1.0 | 1500 | O | 40 | ⊕ |
| 8 | | 50 | | 50 | 30 | 1 | 3.3 | 10 | 1000 | X | 35 | X |
| 9 | | 30 | | 70 | 30 | 300 | 3.3 | 0.8 | 1200 | O | 45 | ⊕ |
| 10 | | 15 | | 85 | 30 | 300 | 3.0 | 0.5 | 1000 | O | 48 | ⊕ |
| 11 | | 10 | | 90 | 30 | 300 | 2.9 | 0.3 | 600 | O | 48 | ⊕ |
| 12 | | 10 | | 90 | 30 | 1 | 2.7 | 10 | 600 | O | 30 | X |
| 13 | CrC | 90 | NiCr | 10 | 30 | 1 | 2.5 | 17 | 600 | X | 20 | X |
| 14 | | 75 | | 25 | 30 | 300 | 2.9 | 7 | 1000 | O | 41 | ⊕ |
| 15 | | 50 | | 50 | 30 | 10000 | 3.7 | 11 | 1100 | O | 29 | X |

TABLE 1-continued

| | | First powder (ceramic) | | Second powder (metal) | | Powder material (granulated) | | | Manufactured article | | | | |
|---|---|---|---|---|---|---|---|---|---|---|---|---|---|
| Example | Type | Composition (% by mass) | Metal powder | Composition (% by mass) | $D_{50}$ (μm) | Granule strength (MPa) | Bulk density (g/cm$^3$) | Porosity (%) | Hardness Hv0.2 | Uniformity | Thickness per layer (μm) | Manufacturing characteristics |
| 16 | | 50 | | 50 | 30 | 5000 | 3.5 | 3 | 1200 | ○ | 35 | ○ |
| 17 | | 50 | | 50 | 30 | 100 | 3.3 | 0.5 | 1200 | ○ | 40 | ⊕ |
| 18 | | 50 | | 50 | 30 | 10 | 3.1 | 4 | 1000 | ○ | 38 | ⊕ |
| 19 | | 50 | | 50 | 30 | 1 | 3.1 | 13 | 800 | X | 30 | X |
| 20 | | 30 | | 70 | 30 | 300 | 3.4 | 0.7 | 800 | ○ | 41 | ⊕ |
| 21 | | 15 | | 85 | 30 | 300 | 3.6 | 0.3 | 700 | ○ | 43 | ⊕ |
| 22 | | 10 | | 90 | 30 | 300 | 3.6 | 0.15 | 700 | ○ | 44 | ⊕ |
| 23 | | 10 | | 90 | 30 | 1 | 3.4 | 7 | 600 | ○ | 32 | X |

[Evaluation]

As apparent from Examples 1 to 12, it was found that mixing ceramic powder (WC in the present examples) and metal powder (Co) to obtain granulated powder made three-dimensional manufacturing possible. All the obtained manufactured articles had a porosity of 20% or less and it was demonstrated that manufactured articles could be conveniently manufactured by normal operation which were denser than conventional powder materials containing a ceramic or cermet. It was also found that the hardness of the obtained manufactured articles could generally be adjusted according to the composition of metal powder and ceramic powder in the additive manufacturing materials. Namely, it was found that the hardness of manufactured articles may change with the peak being at the mass ratio of ceramic powder and metal powder in additive manufacturing material of around 50:50.

However, it is found that, for example, the thickness per layer is not affected by the compositional proportion of ceramic powder and metal powder. The thickness per layer is a factor that may affect the manufacturing speed and manufacturing accuracy during lamination manufacturing.

According to the observation during lamination manufacturing, in manufacturing using the additive manufacturing materials of Examples 1, 8 and 12, additive manufacturing materials were scattered when the additive manufacturing materials were irradiated with a heat source, a laser. The reason for this is believed to be such that due to such low granule strength as 1 MPa of the additive manufacturing materials of Examples 1, 8 and 12, the additive manufacturing materials which were granulated were broken by an impact of laser irradiation. As a result of this, the thickness per layer, namely the manufacturing efficiency decreased. When the thickness per layer of an additive manufacturing material layer of 50 μm was reduced below 35 μm (70%), it is required to perform manufacturing by taking, for example, such a thickness per layer into account. In addition, there is another disadvantage of reduction of manufacturing speed. Therefore, it is preferable that the additive manufacturing material in the form of granulated sintered particles has a granule strength of higher than 1 MPa such as about 10 MPa or more.

In contrast, during manufacturing using additive manufacturing materials of Examples 5 and 17, scattering of materials was not observed because of high granule strength of the additive manufacturing materials. However, as indicated by, for example, Example 4, when the additive manufacturing material had an extremely high granule strength (10000 MPa), it can be considered that sintering of ceramic powder and metal powder was sufficiently progressed to reduce the effect according to the form of normal secondary particles. Namely, it is believed that metal powder was completely melted and combined with ceramic powder, and secondary particles formed dense powder without voids. It is believed that such particles are not in the form of granulated sintered particles any more. In this case, when one particle is irradiated with a laser, the particle has high bulk specific gravity and contains an increased amount of materials to be melted, and thus melting of the particle per se becomes difficult. It is believed that some particles were thus not melted which could not contribute to manufacturing, resulting in a reduction of the thickness per layer. Thus, it was found that for the additive manufacturing material in the form of granulated sintered particles, it is preferable that the granule strength is not as high as 10000 MPa. It was found that the granule strength may be, for example, about 5000 MPa or less as an approximate target.

When additive manufacturing materials of Examples 1, 8 and 12 having low granule strength were used, the additive manufacturing materials during manufacturing were extremely unstable compared to the case where the additive manufacturing materials of Examples 5 to 7 and 9 to 11 having sufficient granule strength were used. It is believed that this resulted in such adverse effects that the manufactured articles had reduced porosity, the texture was not uniform and the hardness was reduced. For example, when the additive manufacturing material of Example 1 was used, the obtained manufactured article had a porosity of about 20% and the manufactured article having a relatively porous texture as shown in FIG. 4(a) was obtained. In contrast, when the additive manufacturing material of Example 6 was used, the manufactured articles had such a reduced porosity as 0.5% and it was observed that the manufactured article had a dense texture as shown in FIG. 4(b). Therefore, also from viewpoints of obtaining a reduced porosity and manufactured articles having more uniform textures and a high degree of hardness, it is found that it is required to appropriately adjust the granule strength of the additive manufacturing material.

For reference, the additive manufacturing material of Example 1 was one obtained by adding to ceramic powder (in this example, WC) 10% by mass of metal powder (in this example, Co), and the obtained manufactured article had a porosity of about 20%. It can be said that the manufactured article of Example 1 is sufficiently dense compared to, for example, manufactured articles manufactured in Non Patent Literature 2 (laminated manufactured articles fromWC-10% Co powder and powder further containing Cu-20% Sn powder).

Examples 13 to 23 represent examples in which additive manufacturing materials prepared from chromium carbide (CrC) as ceramic powder and NiCr alloy as metal powder were used. CrC is generally used as a wear resistant material and NiCr alloy is a heat resistant alloy typically including Inconel, Incoloy and Hastelloy. For example, in the present Examples, ceramic powder had an average particle diameter that was about ½ of the average particle diameter of metal powder. It was found that even when such CrC and NiCr alloy were used for the additive manufacturing material described herein, manufactured articles could be produced. It was found that, however, when it is sought to, for example, configure the thickness per layer to be at or above 35 µm, the granulated particles may have a granule strength of above 1 MPa such as about 10 MPa or more and less than 10000 MPa such as about 5000 MPa or less as an approximate target.

The present invention has been described hereinabove by way of preferable embodiments. However, it is apparent that the descriptions are not limitation and various modifications are possible. Although not indicated specifically, similar results were observed for the additive manufacturing material containing, as ceramic powder, molybdenum boride (MoB) and, as metal powder, Hastelloy, the additive manufacturing material containing, as ceramic powder, alumina ($Al_2O_3$) and, as meatal powder, Inconel, the additive manufacturing material containing, as ceramic powder, silicon carbide (SiC) and, as metal powder, SUS304 steel, the additive manufacturing material containing, as ceramic powder, aluminium nitride (AlN) and, as metal powder, carbon steel, the additive manufacturing material containing, as ceramic powder, boron nitride (BN) and, as metal powder, martensite-age hardened steel, the additive manufacturing material containing, as ceramic powder, boron carbide ($B_4C$) and, as metal powder, Ti-6Al-4V alloy or Ti—Al alloy and the like. A person skilled in the art can understand that the nature and advantages of the technique described herein could be attained by various embodiment.

REFERENCE SIGNS LIST

10 Manufacturing area
11 Wiper
12 Additive manufacturing material stock
13 Means for solidifying the additive manufacturing material
14 Lifting table
20 Additive manufacturing material layer
21 Powder solidified layer

The invention claimed is:

1. A method for producing a three-dimensional manufactured article, comprising:
    (a) preparing an additive manufacturing material comprising a first powder containing a ceramic and a second powder containing a metal, wherein the first powder and the second powder are bound by sintering to form granulated sintered particles in which primary particles of the first powder and primary particles of the second powder are three-dimensionally bound through voids, and the granulated sintered particles have a granule strength of above 1 MPa and less than 10000 MPa;
    (b) forming a thin layer of the additive manufacturing material; and
    (c) applying energy to the formed thin layer to melt or sinter the additive manufacturing material to obtain a powder solidified layer having a desired cross-sectional shape,
    wherein the first powder and the second powder have average particle diameters of 0.1 µm or more and 20 µm or less, and
    wherein a proportion of the second powder to the sum of the first powder and the second powder is 10% by mass or more and 90% by mass or less.

2. The method of claim 1, wherein the granulated sintered particles have a granule strength of 10 MPa or more and 5000 MPa or less.

3. The method of claim 1, wherein the additive manufacturing material has an average particle diameter of 1 µm or more and 100 µm or less.

4. The method of claim 1, wherein the first powder includes a carbide ceramic.

* * * * *